United States Patent
Kuo

(10) Patent No.: US 8,117,757 B2
(45) Date of Patent: Feb. 21, 2012

(54) CUTTER ADAPTER FOR CUTTING MACHINE

(75) Inventor: Tung-Chin Kuo, Taichung County (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 323 days.

(21) Appl. No.: 12/421,747

(22) Filed: Apr. 10, 2009

(65) Prior Publication Data

US 2010/0071526 A1 Mar. 25, 2010

(30) Foreign Application Priority Data

Sep. 19, 2008 (CN) ............ 2008 1 0165643

(51) Int. Cl.
*B27B 11/06* (2006.01)
*B23D 51/08* (2006.01)
(52) U.S. Cl. ............ 30/392; 30/337; 83/699.21; 279/71
(58) Field of Classification Search ............... 83/699.21; 279/71, 77, 78, 81, 82, 87; 30/392–394, 30/335, 337, 338
See application file for complete search history.

(56) References Cited

U.S. PATENT DOCUMENTS

| | | | | |
|---|---|---|---|---|
| 6,612,039 | B2 * | 9/2003 | Kakiuchi et al. | 30/392 |
| 7,251,897 | B2 * | 8/2007 | Shuhua | 30/392 |
| 2008/0168666 | A1 * | 7/2008 | Zhou | 30/339 |
| 2009/0066040 | A1 * | 3/2009 | Teng et al. | 279/81 |
| 2009/0273146 | A1 * | 11/2009 | Dezheng et al. | 279/78 |

FOREIGN PATENT DOCUMENTS

TW 200616741 * 6/2006
* cited by examiner

*Primary Examiner* — Stephen Choi
(74) *Attorney, Agent, or Firm* — Chun-Ming Shih

(57) ABSTRACT

A cutter adapter includes a holder having a receiving portion for inserting a cutter therein; a sleeve sleeved onto the holder and having an annular bevel; a lock pin inserted into the holder and having an active end and a passive end, the passive end being squeezed by the annular bevel when the sleeve is moved, the active end being inserted into the cutter when the passive end is squeezed; and a biasing pin located in the receiving portion and pushed by a spring mounted in the receiving portion. In this way, when intending to mount the cutter to the cutter adapter, the user only needs to insert the cutter into the receiving portion to force the biasing pin to disengage from the lock pin, the lock pin being forced by the annular bevel to insert the active end into the receiving portion to hold the cutter.

9 Claims, 10 Drawing Sheets

US 8,117,757 B2

CUTTER ADAPTER FOR CUTTING MACHINE

BACKGROUND OF THE INVENTION

1. Field of the Invention

The present invention relates generally to cutting machines, and more particularly, to a cutter adapter for a cutting machine.

2. Description of the Related Art

A general cutting machine includes a drive shaft capable of reciprocating motion. A cutter adapter is mounted to a free end of the drive shaft for mounting a cutter thereto. When the drive shaft is moved, the cutter is driven to cut a workpiece.

Referring to FIGS. 1 and 2, a conventional cutter adapter is composed of a main body 1, two steel balls 2, a sleeve 3, and a spring 4. The main body 1 is column-shaped, having a first end 1a for connection with an output shaft of a cutting machine. The main body 1 includes a receiving tunnel 1c and two through holes 1d. The receiving tunnel 1c is provided with an opening formed at a second end 1b of the main body 1. The two through holes 1d are located at two lateral opposite sides of the receiving tunnel 1c. Each of the through holes 1d is provided with two openings formed at the sidewall of the receiving tunnel 1c and the external sidewall of the main body 1 respectively. The two steel balls 2 are located in the two through holes 1d respectively and each has two opposite parts exposed outside the two openings of one of the through holes 1d. The sleeve 3 is hollow and column-shaped, having an annular convex bevel 3a formed on its internal sidewall. The sleeve 3 is sleeved onto the main body 1 to enable the annular convex bevel 3a to face the exposed parts of the two steel balls 2. The spring 4 is mounted between the main body 1 and the sleeve 3 for pushing and keeping the sleeve 3 located at where the annular convex bevel 3a is stopped against the two steel balls 2.

In light of the above, push the sleeve 3 along its imaginary longitudinal axis to overcome the resilience of the spring 4 and to move to where the annular convex bevel 3a is away from the two steel balls 2, and then insert a tang of a cutter 6 into the receiving tunnel 1c of the main body 1. Next, release the sleeve 3 to enable the spring 3 to push the sleeve 3 to where the annular convex bevel 3a is stopped against the two steel balls 2 and to enable the two steel balls 2 to lie against the lock portion 6a of the cutter 6. In this way, the cutter 6 is locked to the cutter adapter. Reversely push the sleeve 3 along its imaginary longitudinal axis to overcome the resilience of the spring 4 for movement and then to enable the annular convex bevel 3a to disengage from the two steel balls 2. Accordingly, the cutter 6 can be freely removed from the cutter adapter.

While replacing the cutter from the conventional cutter adapter, the user's hand must keep pressing the sleeve 3 to keep the sleeve 3 located at where the annular convex bevel 3a is away from the two steel balls 2, such that the user's hand is subject to ache and uncomfortableness to cause the operational inconvenience. Besides, while replacing the cutter, the user not only keeps pressing the sleeve but also applies an axial stress to the drive shaft; if the drive shaft is not located at the top or bottom dead center of its moving path, removing the cutter will cause axial movement of the drive shaft to further potentially hurt the user.

SUMMARY OF THE INVENTION

The primary objective of the present invention is to provide a cutter adapter for a cutting machine, wherein the cutter adapter allows the user to unnecessarily keep applying a force thereto.

The secondary objective of the present invention is to provide a cutter adapter for a cutting machine, wherein the cutter adapter prevents the user from potential injury.

Another objective of the present invention is to provide a cutter adapter for a cutting machine, wherein the cutter adapter allows the user to replace the cutter with less labor and time.

The foregoing objectives of the present invention are attained by the cutter adapter for connection with a cutter and a drive shaft of the cutting machine. The cutter includes a tang having a lock hole. The cutter adapter is composed of a column-shaped holder, a lock pin, a sleeve, a biasing pin, a first spring, and a second spring. The holder includes a first end and a second end, which is adapted for connection with the drive shaft. The holder includes a first receiving portion, a second receiving portion, and a through hole. The first receiving portion defines an opening at the first end of the holder for the tang of the cutter to pass through for connection with the first receiving portion. The second receiving portion defines an opening at a sidewall of the first receiving portion. The through hole runs through an external sidewall of the holder and then the sidewall of the first receiving portion. The lock pin is located in the through hole and is longer than the through hole. The lock pin is movable between a first position and a second position in the through hole. When the lock pin is located at the second position, one end of the lock pin, facing the first receiving portion, is inserted into the lock hole of the cutter located in the first receiving portion. The sleeve includes an annular convexity formed at an internal sidewall and having an annular bevel thereon. The sleeve is sleeved onto the holder for reciprocating movement between a third position and a fourth position on the holder. When the sleeve is moved from the third position to the fourth position, the annular bevel gradually forces the lock pin to move from the first position to the second position. The biasing pin is located in the second receiving portion for reciprocating movement between a fifth position and a sixth position in the second receiving portion. When the biasing is located at the sixth position, one end of the lock pin, facing the first receiving portion, is stopped against the biasing pin in such a way that the lock pin is located at the first position. The first spring is mounted between the sleeve and the holder for keeping the sleeve located at the fourth position. The second spring is mounted in the second receiving portion, having one end stopped against the biasing pin for keeping the biasing pin located at the sixth position.

DETAILED DESCRIPTION OF PREFERRED EMBODIMENTS

Figure 1:
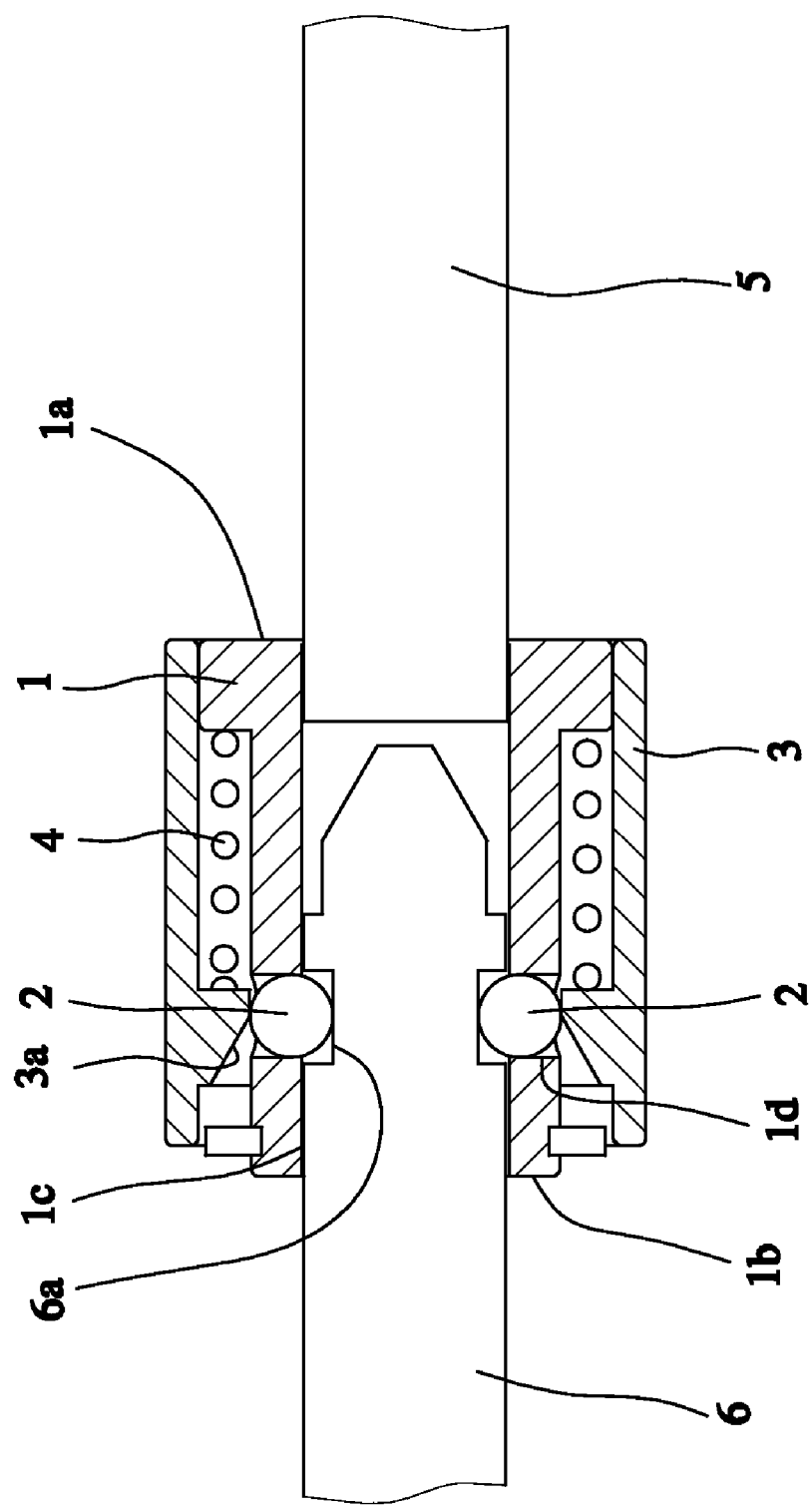
FIG. 1 is a sectional view of a conventional cutter adapter connected between a drive shaft and a cutter.
Figure 2:
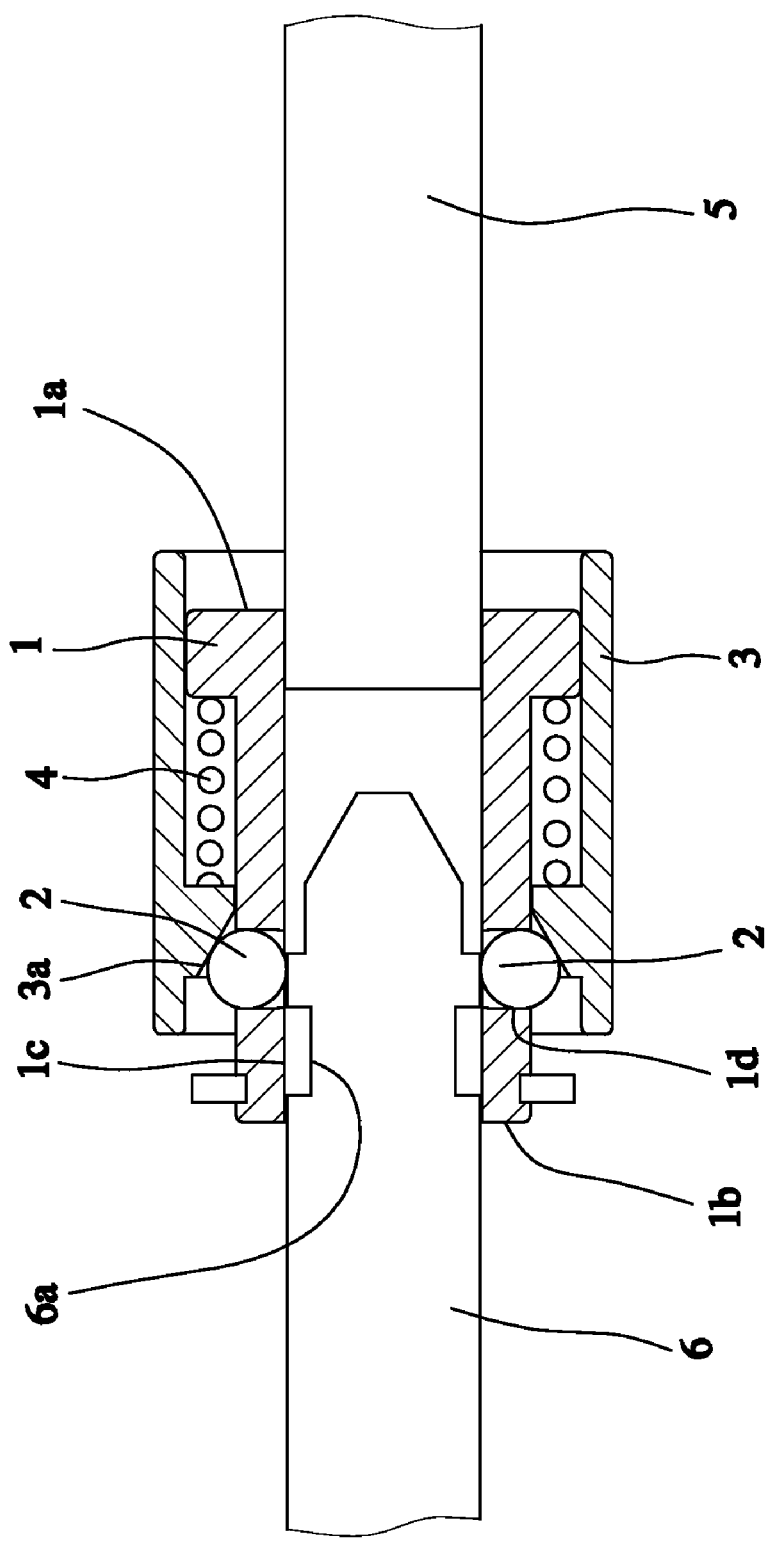
FIG. 2 is a sectional view of the conventional cutter adapter in operation.
Figure 3:
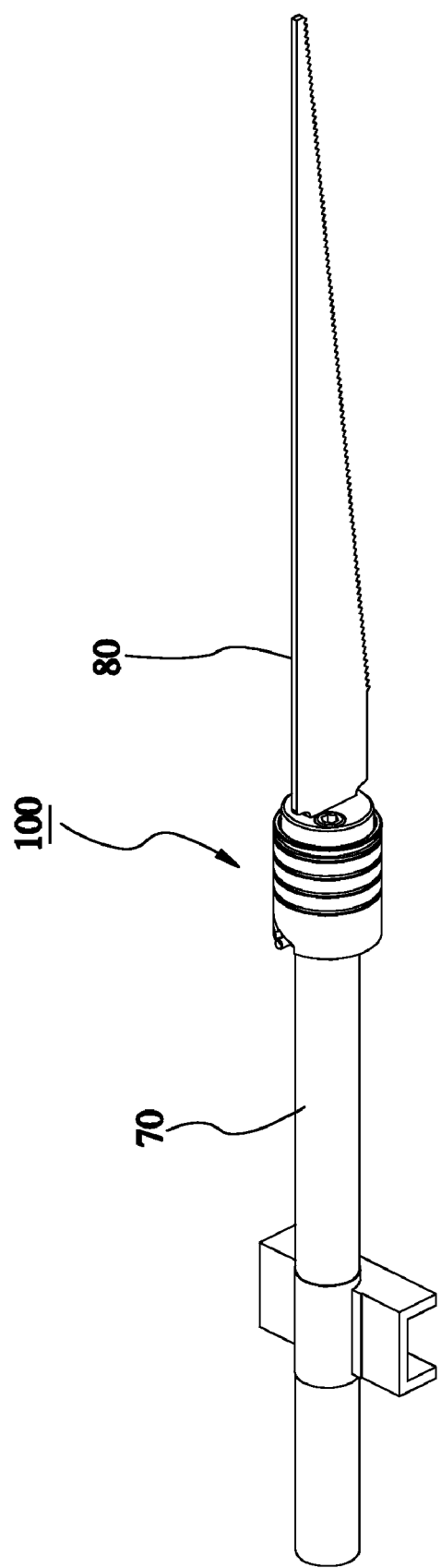
FIG. 3 is a perspective view of a preferred embodiment of the present invention connected between a cutter and a drive shaft of a cutting machine.
Figure 4:
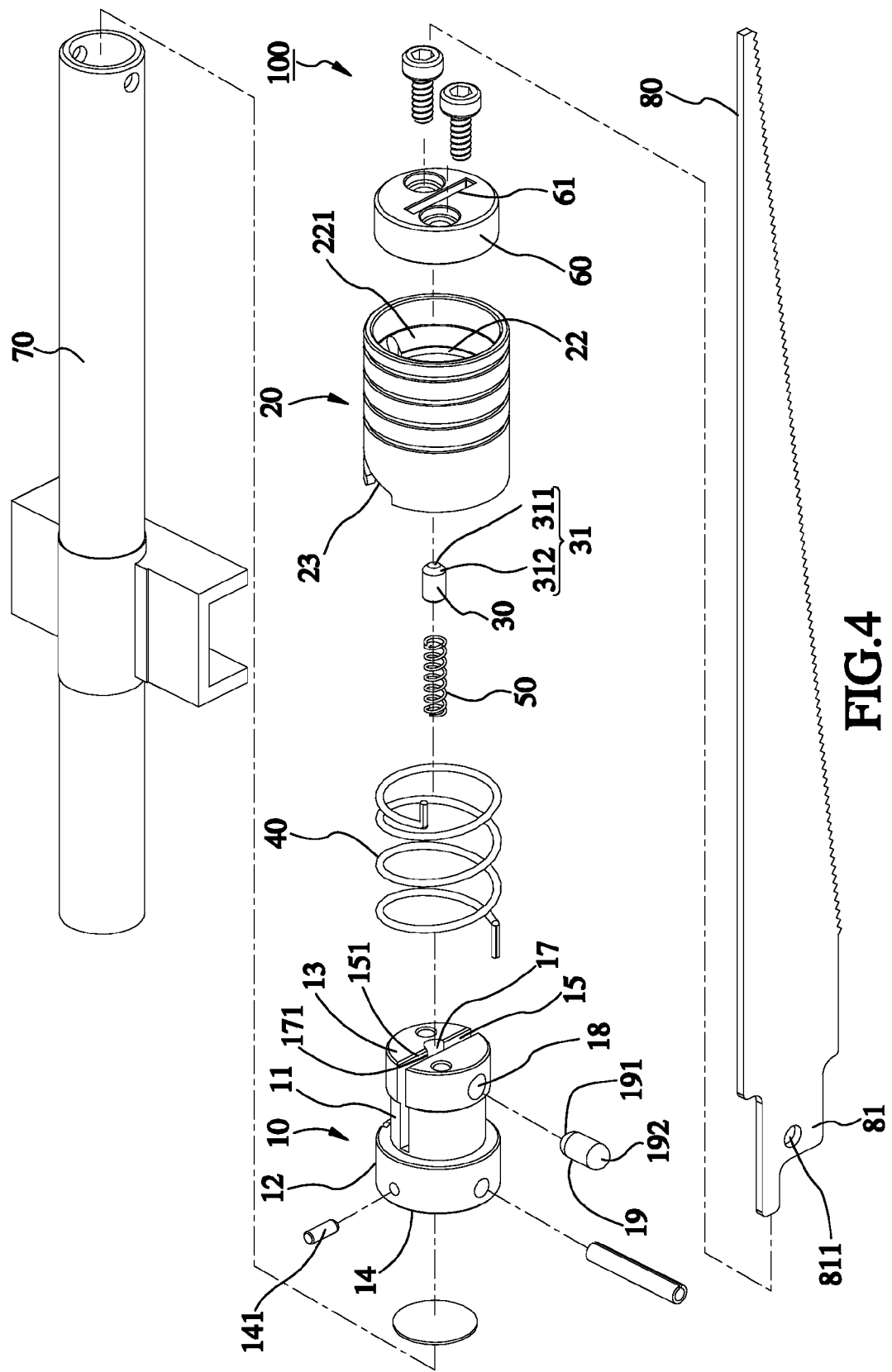
FIG. 4 is an exploded view of the preferred embodiment of the present invention connected between the cutter and the drive shaft of the cutting machine.

Referring to FIGS. 3 and 4, a cutter adapter 100 constructed according to a first preferred embodiment of the present invention is connected with a cutter 80 and a drive shaft 70 of a cutting machine. The cutter 80 includes a tang 81 having a lock hole 811 for the cutter adapter 100 to fasten the cutter 80. The cutter adapter 100 is composed of a holder 10, a lock pin 19, a sleeve 20, a biasing pin 30, a first spring 40, a second spring 50, and a limit cap 60, which are recited in the following respective paragraphs.

The holder 10 is column-shaped and includes a head portion 12 and a body portion 11 axially connected with the head portion 12. The head portion 12 has a larger external diameter than that of the body portion 11. The holder 10 includes a first end 13 and a second end 14. The first end 13 is the free end of the body portion 11. The second end 14 is the free end of the head portion 12 for connection with the drive shaft 70. The body portion 11 has a first receiving portion 15 running through two opposite sides of an external sidewall thereof and having a first opening 151 formed at the first end 13. The tang 81 of the cutter 80 can be inserted into the first receiving portion 15 through the first opening 151. A second receiving portion 17 is formed on the holder 10, defining a second opening 171 at a sidewall of the first receiving portion 15. A through hole 18 runs through the external sidewall of the body portion 11 and then through the sidewall of the first receiving portion 15. A retaining member 141 is inserted into a predetermined position of an external sidewall of the head portion 12.

The lock pin 19 is movably mounted in the through hole 18 for reciprocating movement between a first position and a second position. The lock pin 19 is longer than the through hole 18, having an roundheaded active end 191 and a roundheaded passive end 192. When the lock pin 19 is located at the first position, the passive end 192 protrudes out of the through hole 18. When the lock pin 19 is located at the second position, the active end 191 is inserted through the first receiving portion 15 and then into the lock hole 811 of the cutter 80 to securely hold the cutter 80 on the holder 10.

The sleeve 20 includes an annular convexity 22 formed along an internal circumferential sidewall thereof and having an annular bevel 221. The sleeve 20 includes a retaining sidewall 23 extending slantingways from an initial end thereof to a distal end thereof for a predetermined distance. The sleeve 20 is sleeved onto the holder 10 and rotatable on the holder 10 for reciprocating movement along a central axis of the holder 10 between a third position and a fourth position. When the sleeve 20 is located at the fourth position, the initial end of the retaining sidewall 23 is stopped against the retaining member 141. When the sleeve 20 is moved along the central axis of the holder 10 to the third position, the sleeve 20 is rotated because the retaining sidewall 23 is limited by the retaining member 141. When the sleeve 20 reaches the third position, the distal end of the retaining sidewall 23 is stopped against the retaining member 141. Besides, when the sleeve 20 is moving from the third position to the fourth position, the annular bevel 221 gradually squeezes the passive end 192 of the lock pin 19 to force the lock pin 19 to move from the first position to the second position. When the sleeve 20 reaches the fourth position, the lock pin 19 reaches the second position.

The biasing pin 30 is mounted in the second receiving portion 17 for reciprocating movement between a fifth position and a sixth position. The biasing pin 30 includes a biasing end 31 facing the first end 13 of the holder 10. In this embodiment, the biasing end 31 has a flat end face 311 and a taper-shaped portion 312. The biasing end 31 can alternatively be roundheaded or the like. When the biasing pin 30 is located at the sixth position, the active end 191 of the lock pin 19 is stopped against the biasing pin 30 in such a way that the lock pin 19 is located at the first position.

The first spring 40 is mounted between the sleeve 20 and the holder 10, having two ends, one of which is fixed to the head portion 12 of the holder 10 and the other is fixed to the annular convexity 22 of the sleeve 20, for keeping the sleeve 20 located at the fourth position to enable the annular bevel 221 to be stopped against the passive end 192 of the lock pin 19.

The second spring 50 is mounted to the second receiving portion 17, having one end stopped against the biasing pin 30 for keeping the biasing pin 30 located at the sixth position.

The limit cap 60 is connected with the first end 13 of the holder 10. The limit cap 60 includes a larger external diameter than an internal diameter of the annular convexity 22 in such a way that the annular convexity 22 is held between the limit cap 60 and the head portion 12 to prevent the sleeve 20 from disengagement from the holder 10. The limit cap 60 includes an opening 61 in communication with the first receiving portion 15.

Figure 5:
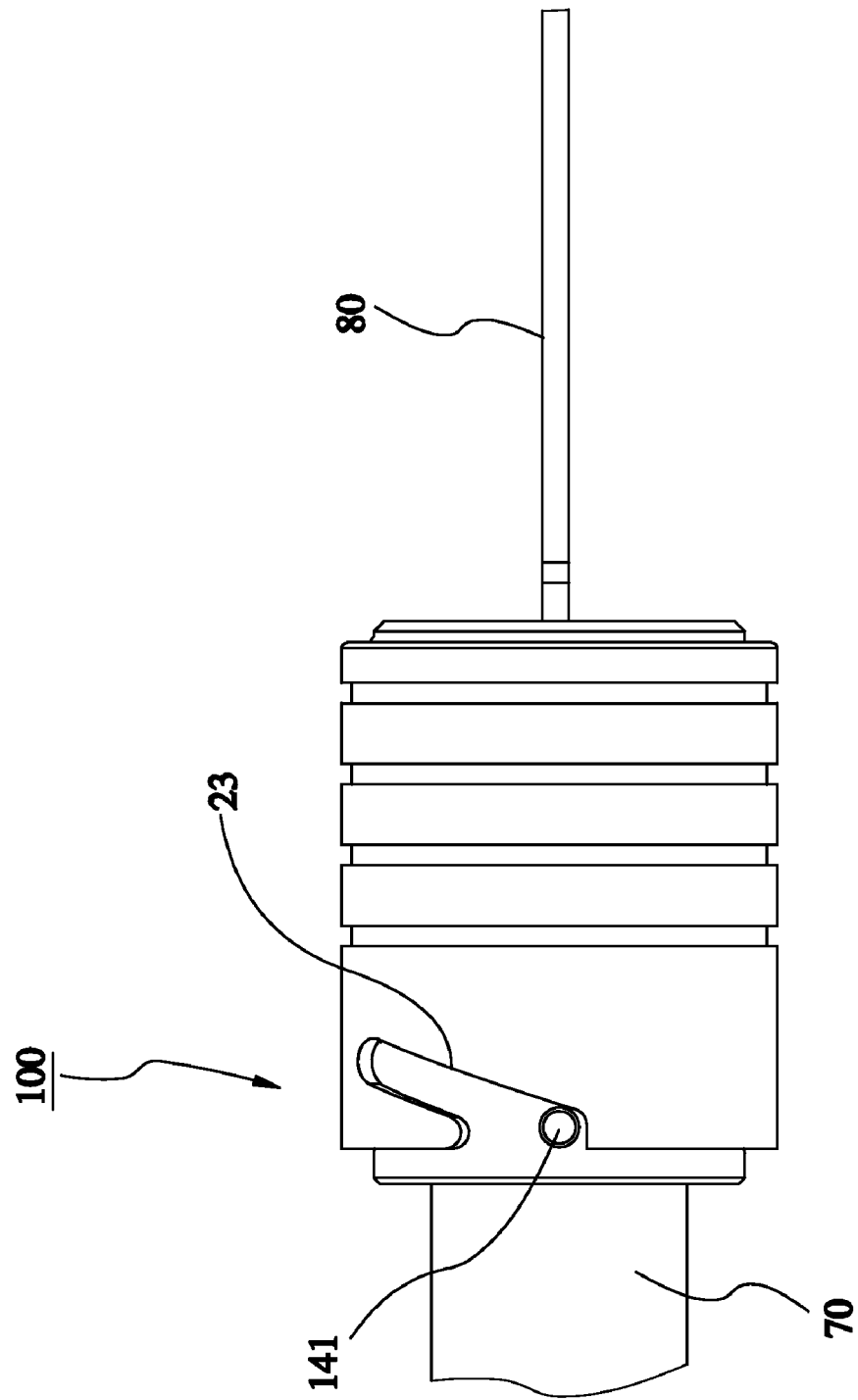
FIG. 5 is an enlarged side view of the preferred embodiment of the present invention connected between the cutter and the drive shaft of the cutting machine, illustrating that the cutter is locked to the cutter adapter.
Figure 6:
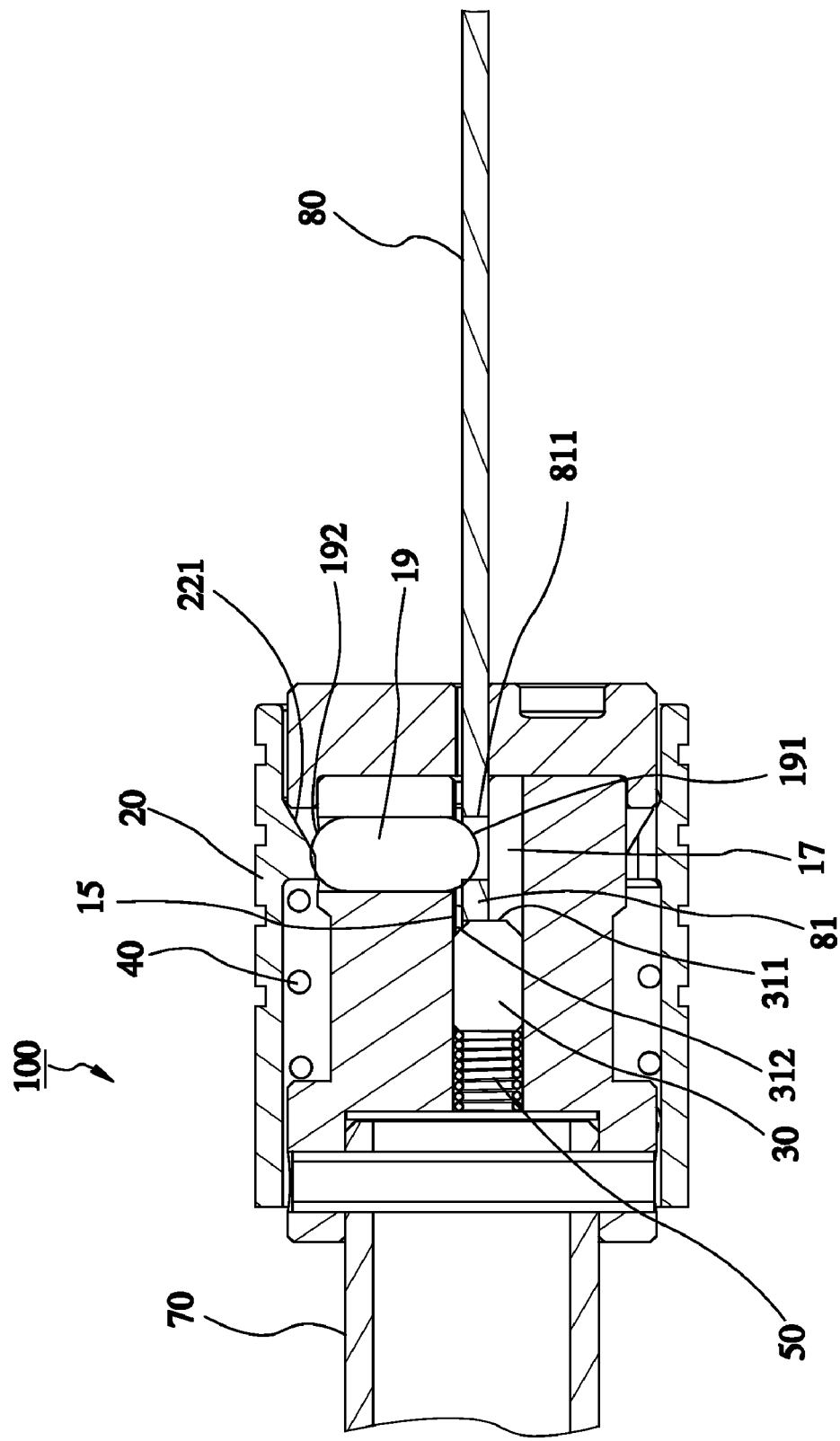
FIG. 6 is a sectional view of FIG. 5.

Referring to FIGS. 5 and 6, when the cutter 80 is inserted into the cutter adapter 100, the end face 311 is pushed by the tang 81 in such a way that the biasing pin 30 pushes the second spring 50 to be located at the fifth position. On the other hand, the sleeve 20 keeps located at the fourth position by the resilience of the first spring 40; the annular bevel 221 squeezes the passive end 192 of the lock pin 19 to force the lock pin 19 to be located at the second position and enables the active end 191 to enter the lock hole 811 of the cutter 80 in such a way that the cutter 80 is locked to the cutter adapter 100. In the meantime, the torsion of the first spring 40 forces the initial end of the retaining sidewall 23 to be stopped against the retaining member 141.

Figure 7:
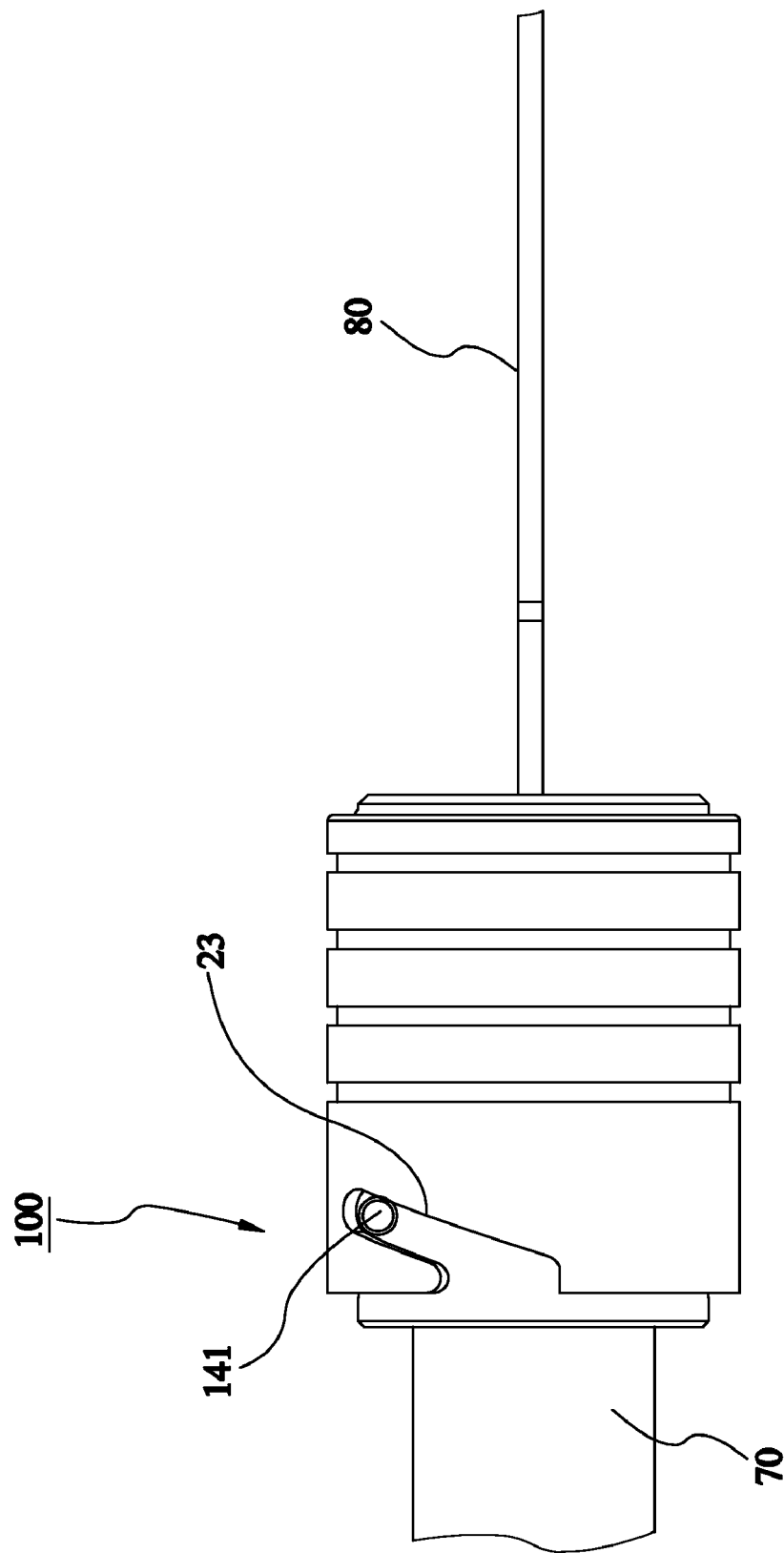
FIG. 7 is similar to FIG. 5, illustrating that the cutter is not locked to the cutter adapter.
Figure 8:
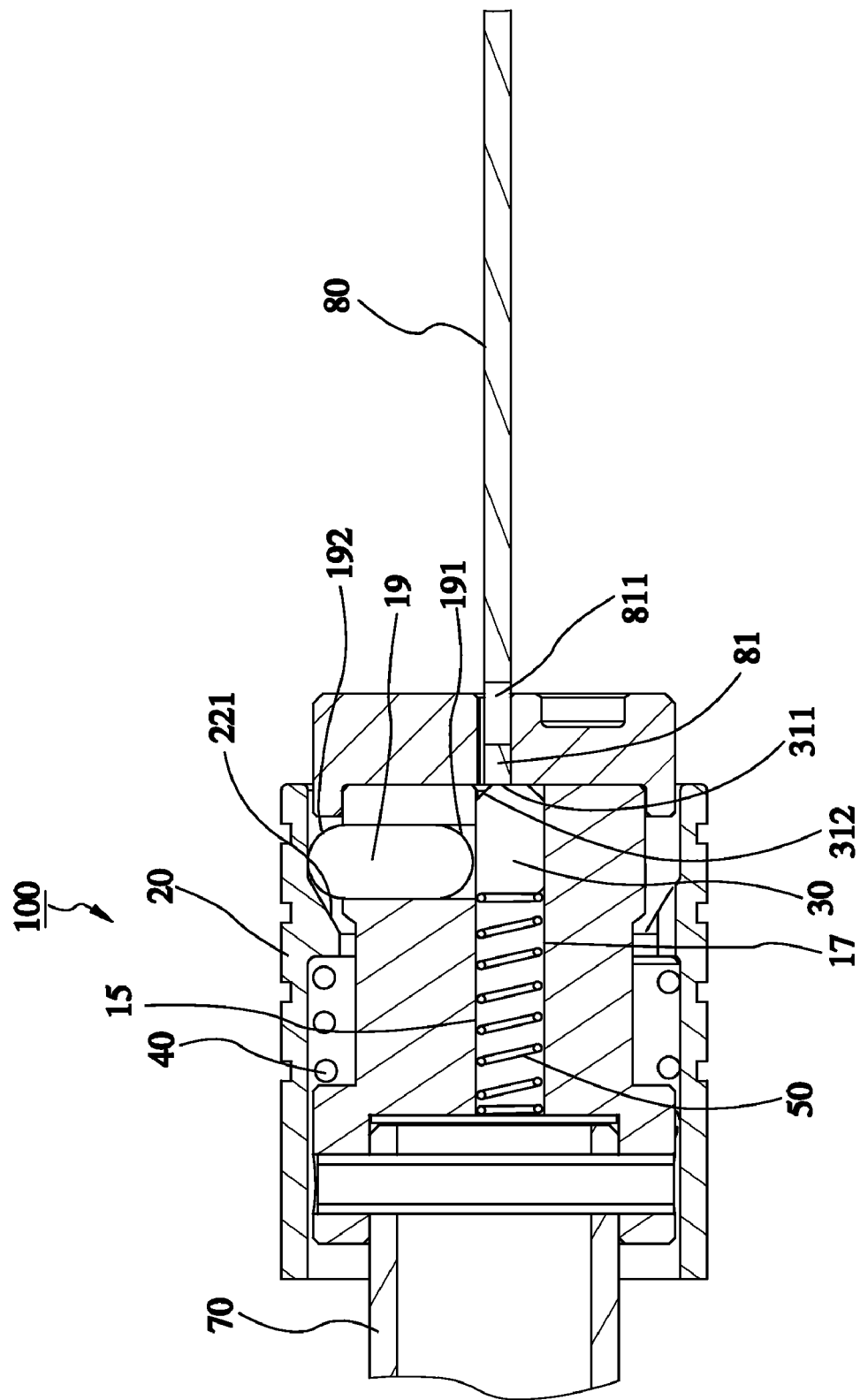
FIG. 8 is a sectional view of FIG. 7.

Referring to FIGS. 7 and 8, while detaching the cutter 80 from the cutter adapter 100 is intended, push the sleeve 20 toward the third position, i.e. the second of the holder 10. In this way, the sleeve 20 is spirally rotated along the retaining sidewall 23 because the retaining sidewall 23 is stopped by the retaining member 141. When the distal end of the retaining sidewall 23 is stopped against the retaining member 141, the sleeve 20 reaches the third position, and then the annular bevel 221 disengages from the passive end 192 to disable the lock pin 19 from locking the cutter 80. The taper-shaped portion 312 of the biasing pin 30 is biased by the second spring 50 to stop against the active end 191 of the lock pin 19 and push the lock pin 19 to return to the first position. Meanwhile, the end face 311 of the biasing pin 30 is stopped against the tang 81 of the cutter 80 to push the cutter 80 out of the first receiving portion 15. After the lock pin 19 returns to the first position, the passive end 192 protrudes beyond an external sidewall of the body portion 12 stop the sleeve 20 from returning to the fourth position and to hold the sleeve 20 at the third position. In this way, the user does not have to keep applying any force to the sleeve 20 but moves the hand away from the sleeve 20. Because the aforesaid detaching operation is done in a short time and the user only needs to push the sleeve for its rotation and then move the hand away from the sleeve 20, it prevents the user's hand from ache. In addition, the biasing pin 30 is biased by the second spring 50 to push the cutter 80 to disengage from the first receiving portion 15, allowing the user to pull the cutter 80 from the cutter adapter 100 without lots of efforts. Therefore, the present invention provides the timesaving and laborsaving operation.

Figure 9:
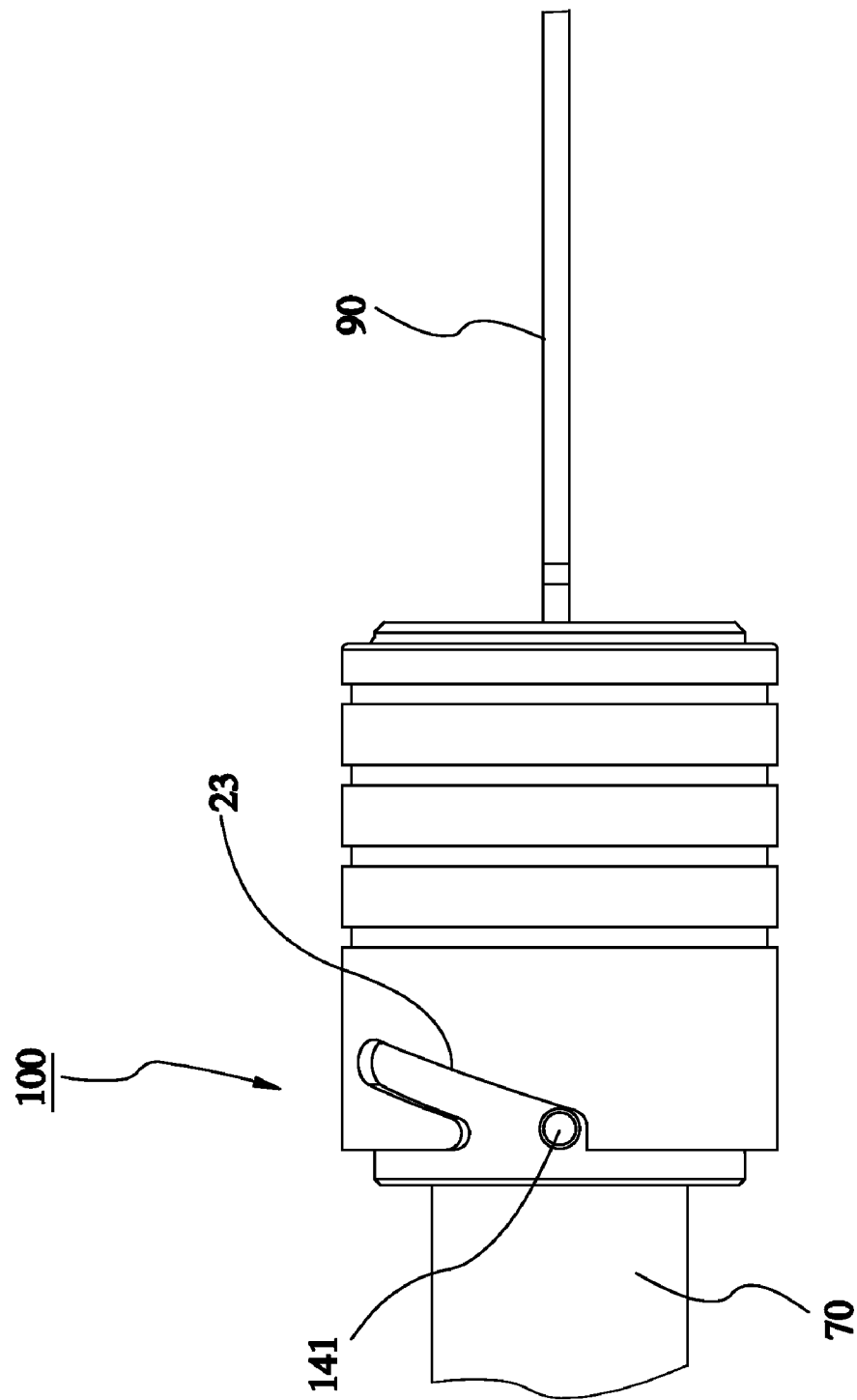
FIG. 9 is similar to FIG. 6, illustrating that another cutter is locked to the cutter adapter.
Figure 10:
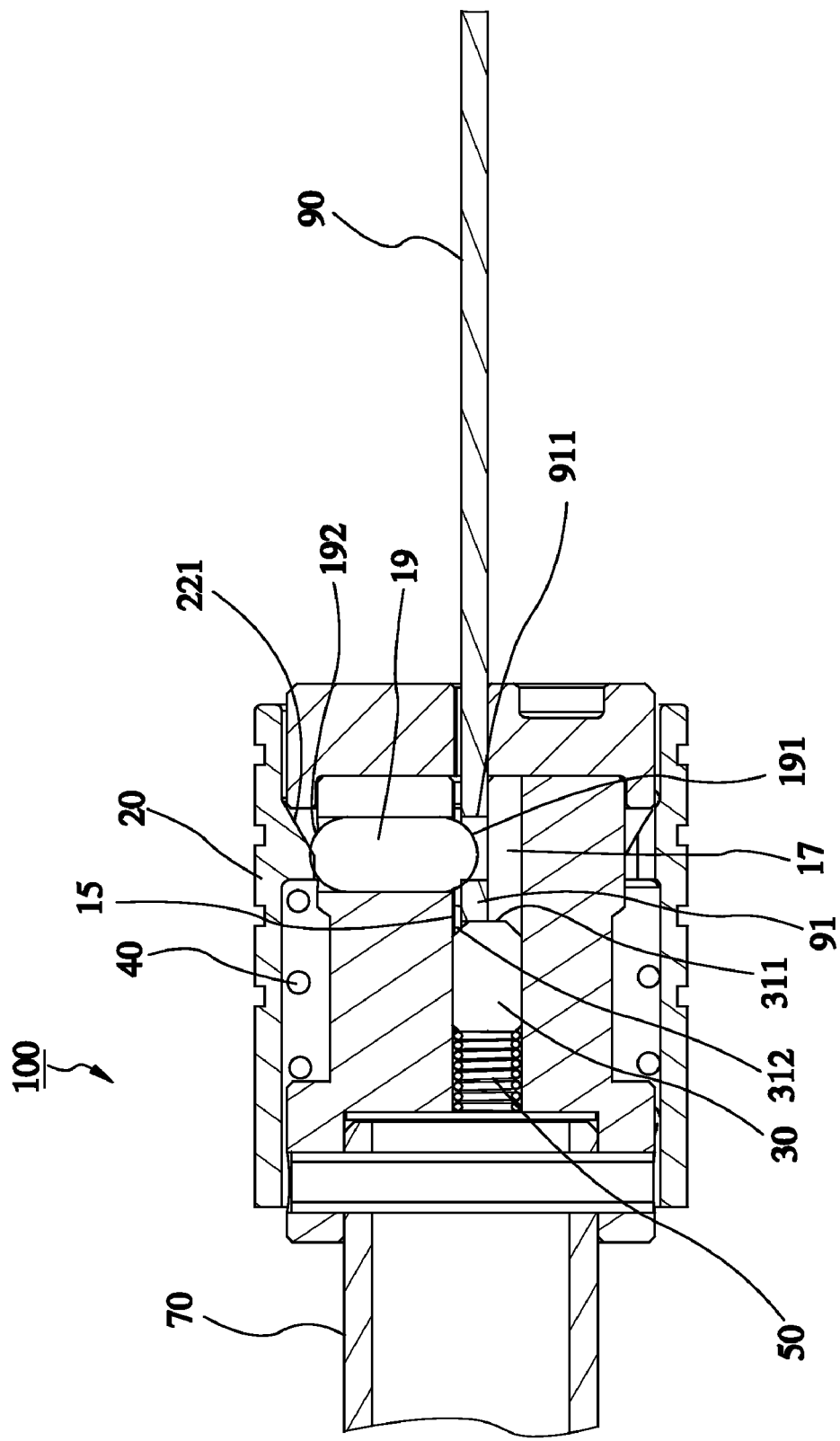
FIG. 10 is a sectional view of FIG. 9.

Referring to FIGS. 9 and 10, while installing another cutter 90 to the cutter adapter 100 is intended, insert the tang 91 of the cutter 90 into the first receiving portion 15 and then push the biasing pin 30 to overcome the resilience of the second spring 50 in such a way that the biasing pin 30 is away from the passive end 192 of the lock pin 19 to return to the fifth position. In the meantime, the lock pin 19 is not stopped against the biasing pin 30 to be movable back to the second position. The first spring 40 applies an axial resilience and a diametric torsion to the sleeve 20, such that the sleeve 20 is spirally rotated toward the first end 13 of the holder 10 to enable the annular bevel 221 to lie against the passive end 192 of the lock pin 19 to further move the lock pin 19 to the second position. In this way, the cutter 90 is locked to the cutter adapter 100. The diametric torsion of the first spring 40 against the sleeve 20 enables the retaining sidewall 23 to keep stopped against the retaining member 141, whereby when the drive shaft 70 drives the cutter adapter 100 for rapid reciprocating movement, the sleeve 20 is prevented from generation of inertia resulted from the reciprocating movement and from movement forced by the inertia and counterworking the first spring 40, thus preventing the cutter 90 from disengagement from the cutter adapter 100.

Before the cutter 90 is installed to the cutter adapter 100, the sleeve 20 is held at the third position, such that the user only has to directly insert the cutter 90 into the first receiving portion 15 and then the biasing pin 30 can be instantly pushed to the fifth position to force the lock pin 19 to reach the second position and to securely hold the cutter 90. Therefore, the whole operation is timesaving and laborsaving.

Although the present invention has been described with respect to a specific preferred embodiment thereof, it is no way limited to the details of the illustrated structures but changes and modifications may be made within the scope of the appended claims.

What is claimed is:

1. A cutter adapter for connection with a cutter and a drive shaft of a cutting machine, said cutter having a tang having a lock hole, said cutter adapter comprising:

a column-shaped holder having a first end and a second end, the second end being adapted for connection with said drive shaft, said holder having a first receiving portion, a second receiving portion, and a through hole, said first receiving portion having a first opening at an end surface of the first end for said tang of said cutter to pass through for connection with said first receiving portion, said through hole running through an external sidewall of said holder and a sidewall of said first receiving portion, said second receiving portion having a second opening running through a sidewall of said first receiving portion and a third opening at the end surface of the first end;

a lock pin located in said through hole and being longer than said through hole, said lock pin being movable between a first position and a second position; when said lock pin is located at the second position, an end of said lock pin, facing said first receiving portion, is inserted into said lock hole of said cutter received in said first receiving portion;

a sleeve having an annular convexity formed along an internal circumferential sidewall thereof and having an annular bevel, said sleeve being sleeved onto said holder and movable between a third position and a fourth position along a central axis of said holder; when said sleeve is moved from the third position to the fourth position, said annular bevel gradually forces said lock pin to move from the first position to the second position;

a limit cap connected with the first end of the holder, having a larger external diameter than an internal diameter of said annular convexity, for preventing said sleeve from disengagement from said holder, said limit cap including an opening in communication with said first receiving portion and at least covering a part of said third opening of said second receiving portion;

a biasing pin located in said second receiving portion and movable between a fifth position and a sixth position; when said biasing pin is located at the sixth position, an end of said lock pin, facing said first receiving portion, is stopped against on a proper of said biasing pin, and a biasing end of said biasing pin, facing the first end of said holder, is stopped against on said limit cap, whereby said lock pin is located at the first position;

a first spring mounted between the sleeve and the holder for keeping said sleeve located at the fourth position; and a second spring mounted in said second receiving portion and having an end stopped against said biasing pin for keeping said biasing pin located at the sixth position.

2. The cutter adapter as defined in claim 1, wherein said biasing end having a flat end face and a taper-shaped portion.

3. The cutter adapter as defined in claim 1, wherein said biasing pin comprises a roundheaded biasing end facing the first end of said holder.

4. The cutter adapter as defined in claim 1, wherein said lock pin comprises a passive end and an active end, said passive end facing the external sidewall of said holder; when said sleeve is moved from the third position to the fourth position, said annular bevel gradually forces said lock pin to move from the first position to the second position, said active end facing said first receiving portion; when said lock pin is located at the second position, said active end of said lock pin is inserted into said lock hole of said cutter received in said first receiving portion.

5. The cutter adapter as defined in claim 4, wherein said active and passive ends of said lock pin are round-headed.

6. The cutter adapter as defined in claim 2, wherein said lock pin comprises a roundheaded passive end and a roundheaded active end, said passive end facing the external sidewall of said holder; when said sleeve is being moved from the third position to the fourth position, said annular bevel gradually squeezes the passive end of said lock pin to force said lock pin to move from the first position to the second position, said active end facing said first receiving portion; when said lock pin is located at the second position, the active end of said lock pin is inserted into said lock hole of said cutter received in said first receiving portion.

7. The cutter adapter as defined in claim 3, wherein said lock pin comprises a roundheaded passive end and a roundheaded active end, said passive end facing the external sidewall of said holder; when said sleeve is being moved from the third position to the fourth position, said annular bevel gradually squeezes the passive end of said lock pin to force said lock pin to move from the first position to the second position, said active end facing said first receiving portion; when said lock pin is located at the second position, said active end of said lock pin is inserted into said lock hole of said cutter received in said first receiving portion.

8. The cutter adapter as defined in claim 1, wherein said biasing pin is a cylinder entirely located inside said second receiving portion.

9. The cutter adapter as defined in claim 1, wherein said second opening of said second receiving portion is formed on the sidewall of said first receiving portion facing said through hole.

* * * * *